United States Patent
Amano

(10) Patent No.: US 9,628,943 B2
(45) Date of Patent: Apr. 18, 2017

(54) COMMUNICATION APPARATUS, CONTROL METHOD FOR COMMUNICATION APPARATUS, AND STORAGE MEDIUM STORING PROGRAM

(71) Applicant: CANON KABUSHIKI KAISHA, Tokyo (JP)

(72) Inventor: Ryosuke Amano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/802,927

(22) Filed: Jul. 17, 2015

(65) Prior Publication Data

US 2016/0029152 A1 Jan. 28, 2016

(30) Foreign Application Priority Data

Jul. 23, 2014 (JP) .................................. 2014-149932

(51) Int. Cl.
*H04W 40/36* (2009.01)
*H04W 4/00* (2009.01)
(Continued)

(52) U.S. Cl.
CPC .......... *H04W 4/008* (2013.01); *H04B 5/0031* (2013.01); *H04B 5/02* (2013.01);
(Continued)

(58) Field of Classification Search
CPC ... H04W 4/008; H04W 76/023; H04W 40/36; H04W 72/02; H04W 88/02;
(Continued)

(56) References Cited

U.S. PATENT DOCUMENTS

| 2014/0063537 A1* | 3/2014 | Nishikawa | ............ | H04W 4/008 |
| | | | | 358/1.15 |
| 2014/0075523 A1* | 3/2014 | Tuomaala | ............. | H04L 63/083 |
| | | | | 726/6 |

(Continued)

FOREIGN PATENT DOCUMENTS

| JP | 2009-207069 A | 9/2009 |
| JP | 4894826 B2 | 3/2012 |

(Continued)

OTHER PUBLICATIONS

Connection Handover Technical Specification NFC Forum Connection Handover 1.2 NFCForum-TS-ConnectionHandover_1_2.doc 2010-07-07-07.

*Primary Examiner* — Andrew Wendell
(74) *Attorney, Agent, or Firm* — Canon USA Inc., IP Division

(57) ABSTRACT

A communication apparatus that determines between apparatuses whether a service is executable before a wireless LAN connection is established and that establishes the wireless LAN connection only when the service is executable includes a determination unit that determines, if the communication apparatus and a communication partner apparatus overlap each other in terms of their roles as a requester when performing a handover, whether to transmit a response message in response to a request message received from the communication partner apparatus, and a transmission unit that transmits, if the determination unit determines to transmit the response message, a response message rejecting the connection using a second communication method to the communication partner apparatus using a first communication unit that performs wireless commu-
(Continued)

nication using a first communication method, regardless of whether the connection using the second communication method is executable.

11 Claims, 11 Drawing Sheets

(51) Int. Cl.
| | |
|---|---|
| *H04W 8/00* | (2009.01) |
| *H04B 5/02* | (2006.01) |
| *H04W 76/02* | (2009.01) |
| *H04B 5/00* | (2006.01) |
| *H04W 36/00* | (2009.01) |
| *H04W 52/02* | (2009.01) |
| *H04W 88/02* | (2009.01) |
| *H04W 84/12* | (2009.01) |
| *H04W 88/06* | (2009.01) |

(52) U.S. Cl.
CPC ........... *H04W 8/005* (2013.01); *H04W 36/00* (2013.01); *H04W 40/36* (2013.01); *H04W 52/0229* (2013.01); *H04W 76/023* (2013.01); *H04W 84/12* (2013.01); *H04W 88/02* (2013.01); *H04W 88/06* (2013.01)

(58) Field of Classification Search
CPC ......... H04W 36/0016; H04W 36/0083; H04W 36/16; H04W 36/34; H04B 5/0031; H04B 5/02; H04B 1/005
See application file for complete search history.

(56) References Cited

U.S. PATENT DOCUMENTS

| | | | |
|---|---|---|---|
| 2014/0091987 A1* | 4/2014 | Lee | H04L 65/00 345/2.3 |
| 2014/0256256 A1* | 9/2014 | Park | H04W 36/14 455/41.1 |
| 2014/0274058 A1* | 9/2014 | Son | H04W 36/0055 455/436 |
| 2015/0004908 A1* | 1/2015 | Lee | H04W 76/023 455/41.1 |
| 2015/0111493 A1* | 4/2015 | Berkema | H04W 8/005 455/41.1 |
| 2015/0296416 A1* | 10/2015 | Lee | H04W 8/005 370/331 |

FOREIGN PATENT DOCUMENTS

| | | |
|---|---|---|
| JP | 2013-78061 A | 4/2013 |
| JP | 2013-517659 A | 5/2013 |

\* cited by examiner

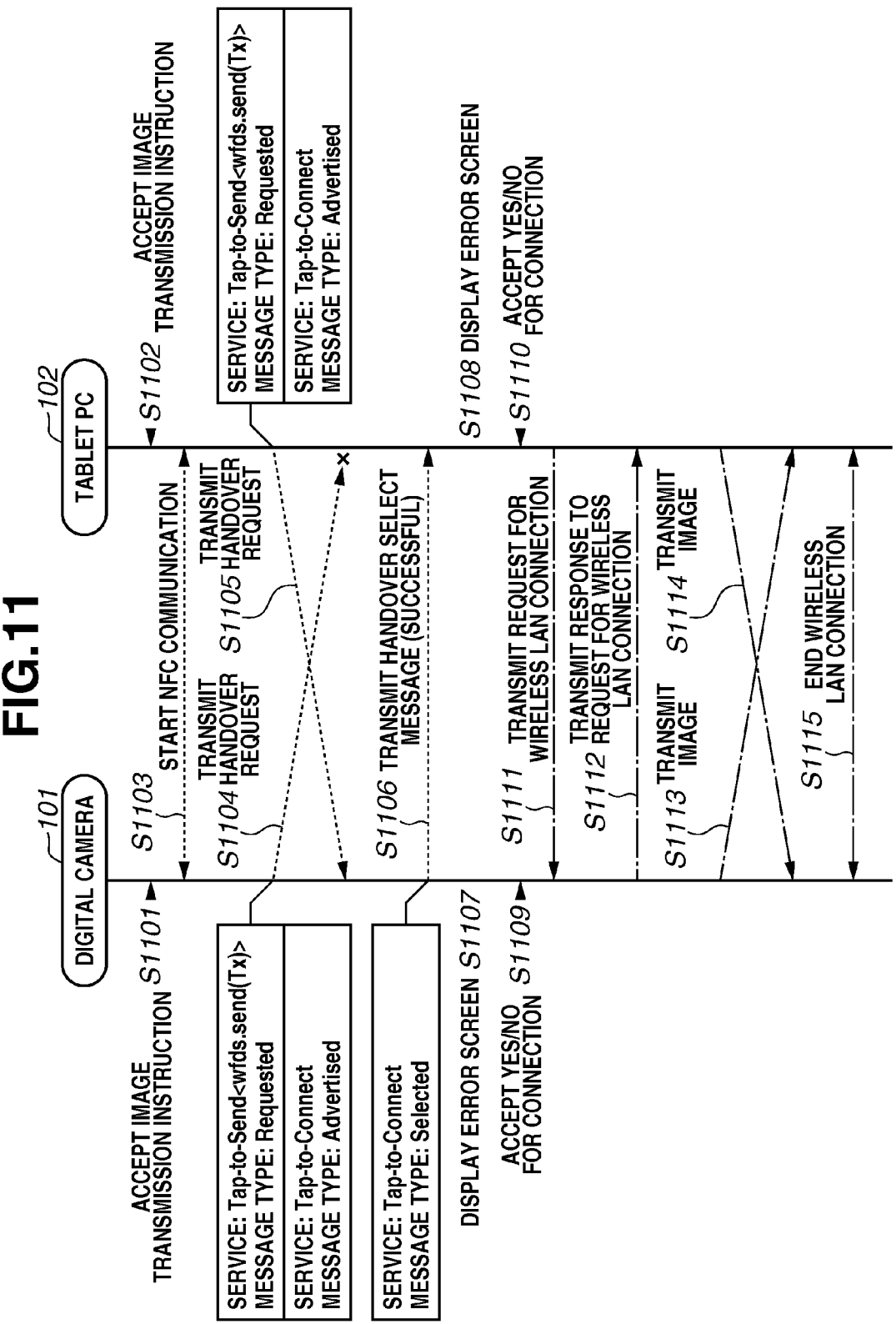

COMMUNICATION APPARATUS, CONTROL METHOD FOR COMMUNICATION APPARATUS, AND STORAGE MEDIUM STORING PROGRAM

BACKGROUND

Field

Aspects of the present invention generally relate to a communication technology.

Description of the Related Art

Conventionally, there are known mobile terminals capable of using short range wireless communication such as Near Field Communication (NFC), Infrared Data Association (IrDA), and TransferJet®. In the short range wireless communication, just bringing apparatuses close to each other allows transmission and reception of data between the apparatuses. In addition, there is a technology of executing a handover from such short range wireless communication to a different wireless communication method such as a wireless local area network (LAN) (Institute of Electrical and Electronics Engineers (IEEE) 802.11 series) and Bluetooth®.

In addition, there is known an apparatus that communicates information via short range wireless communication, when executing a handover from the short range wireless communication, as discusses in Japanese Patent Application Laid-Open No. 2009-207069. The information includes communication parameters for a wireless communication method to be used after the handover, and capability information about applications executable by the apparatus.

In a handover from NFC, communication may be performed between two roles, i.e., a requester and a selector. The requester transmits a request message requesting another apparatus to execute a handover, and the selector performs selection as to whether the requested handover is executable.

In this case, when each of apparatuses communicating via the NFC transmits a request message as a requester, the apparatuses can perform avoiding processing for avoiding a conflict between the apparatuses in terms of their roles. Specifically, each of the apparatuses communicating via the NFC compares a predetermined value included in the received request message with a predetermined value included in the transmitted request message, and then allows the one corresponding to the smaller value to operate as a selector, so that the conflict can be avoided.

However, no response message is transmitted in response to the request message transmitted from the apparatus determined to be the selector by the avoiding processing. In other words, without receiving a response to the transmitted request message, the apparatus determined to be the selector by the avoiding processing is required to respond to the request message received from the other apparatus serving as a communication partner apparatus. Therefore, the apparatus determined to be the selector by the avoiding processing executes a handover requested by the communication partner apparatus, while whether communication based on a handover of its own request is executable is unclear. Accordingly, there are concerns such as an unintended increase in processing load and an occurrence of unexpected power consumption.

SUMMARY

According to an aspect of the present invention, a communication apparatus includes a first communication unit configured to perform wireless communication with another communication apparatus, using a first communication method, a second communication unit configured to perform wireless communication with the another communication apparatus, using a second communication method in which a communication speed is higher than a communication speed in the first communication method, a determination unit configured to determine, when the communication apparatus is connected to the another communication apparatus by the first communication unit, if the communication apparatus transmits a request message requesting a connection with the another communication apparatus by the second communication unit, and receives a request message requesting a connection using the second communication method from the another communication apparatus, whether to transmit a response message in response to the received request message, and a transmission unit configured to transmit, if the determination unit determines to transmit the response message, a response message rejecting the connection using the second communication method to the another communication apparatus using the first communication unit, regardless of whether the connection using the second communication method requested in the request message received from the another communication apparatus is executable.

Further features of the present disclosure will become apparent from the following description of exemplary embodiments (with reference to the attached drawings).

BRIEF DESCRIPTION OF THE DRAWINGS

FIG. 11 illustrates an example of a communication sequence between the digital camera and the tablet PC according to the exemplary embodiment.

DESCRIPTION OF THE EMBODIMENTS

The exemplary embodiment is directed to alleviation of inconvenience in a case where apparatuses connected to each other transmit respective request messages to each other.

Figure 1:
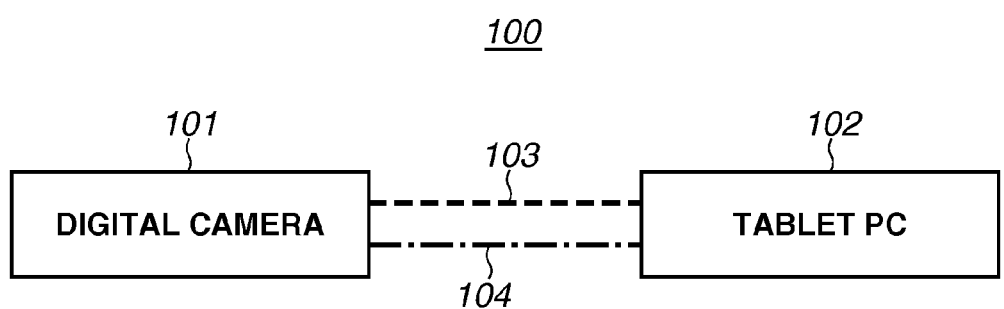
FIG. 1 is a block diagram exemplifying a system configuration according to an exemplary embodiment.

A communication apparatus and a communication system according to the present exemplary embodiment will be described below in detail with reference to the drawings. FIG. 1 is a block diagram illustrating an apparatus configuration of a system 100 assumed in the present exemplary embodiment described below. The system 100 includes a digital camera 101 and a tablet personal computer (PC) 102 each serving as a communication apparatus according to the present exemplary embodiment. The digital camera 101 and the tablet PC 102 can communicate with each other, by using Near Field Communication (NFC) communication 103. The present exemplary embodiment is described assuming that communication is performed in a bidirectional communication mode in which the digital camera 101 and the tablet PC 102 can exchange data therebetween via the NFC communication 103. The NFC communication 103 has other modes such as a card emulation mode and a read/write mode. Further, the digital camera 101 and the tablet PC 102 can communicate with each other by using wireless LAN communication 104.

Figure 2:
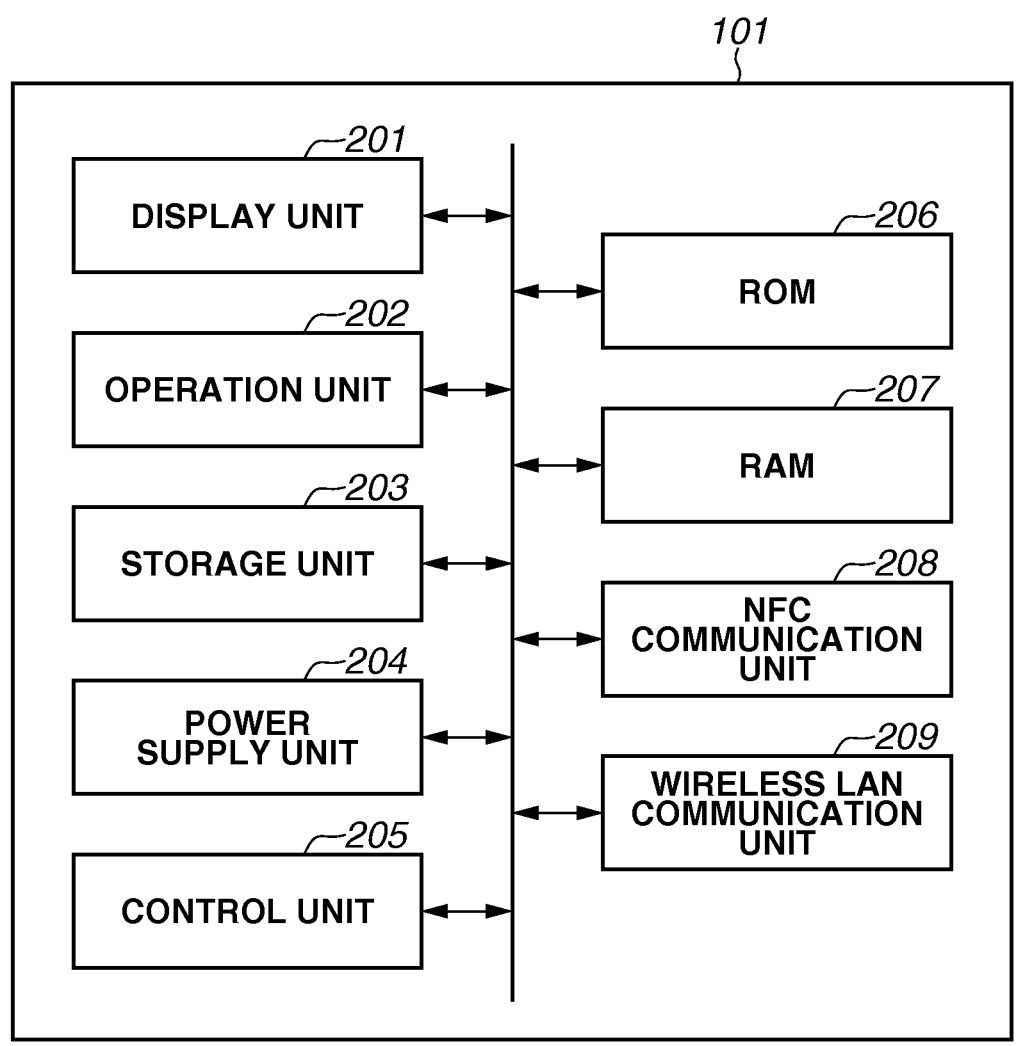
FIG. 2 is a block diagram illustrating an example of a hardware configuration of a digital camera according to the exemplary embodiment.

Next, FIG. 2 is a block diagram illustrating a hardware configuration of the digital camera 101.

The digital camera 101 includes a display unit 201, an operation unit 202, a storage unit 203, a power supply unit 204, a control unit 205, a read only memory (ROM) 206, a random access memory (RAM) 207, an NFC communication unit 208, and a wireless LAN communication unit 209.

The display unit 201 includes, for example, components such as a liquid crystal display (LCD) and a light emitting diode (LED), and has a function of outputting information that can be visually recognized by a user. The display unit 201 displays a user interface (UI) according to an application. The operation unit 202 has a function of receiving various inputs from the user for operation of the communication apparatus. The storage unit 203 includes, for example, a storage medium such as a hard disk drive (HDD), a flash memory, and a detachable secure digital (SD) card. The storage unit 203 stores and manages various kinds of data, such as wireless communication network information, data transmission/reception information, and image data. The power supply unit 204 is a battery, for example, which retains power to operate the entire apparatus, and supplies the power to each piece of hardware.

The control unit 205 is a central processing unit (CPU), for example, and controls operation of each component of the digital camera 101. The ROM 206 stores control commands, i.e., a program. Various operations described below are implemented by the control unit 205 executing the control program stored in the ROM 206. The RAM 207 is used, for example, as a work memory in execution of a program, and used to store data temporarily. The NFC communication unit 208 performs the NFC communication 103. The NFC communication unit 208 performs wireless communication conforming to communication rules defined by the NFC Forum. When detecting a communicable apparatus within a communication range, the NFC communication unit 208 automatically establishes the NFC communication 103. The NFC communication unit 208 performs the wireless communication conforming to the NFC standards. However, the NFC communication unit 208 may employ a communication method using a communication distance shorter than a communication distance of a communication method used by the wireless LAN communication unit 209. Further, the NFC communication unit 208 may employ any type of communication method whose communication speed is lower than the communication speed of the communication method used by the wireless LAN communication unit 209. For example, the NFC communication unit 208 may use a Bluetooth® Low Energy (BLE) method defined in Bluetooth® 4.0. Further, the NFC communication unit 208 may use another communication method, such as TransferJet® and Infrared Data Association (IrDA).

The wireless LAN communication unit 209 performs the wireless LAN communication 104. The wireless LAN communication unit 209 performs wireless communication conforming to the Institute of Electrical and Electronics Engineers (IEEE) 802.11 series. In the present exemplary embodiment, the wireless LAN communication unit 209 is assumed to perform the wireless communication conforming to the IEEE 802.11 series, but may use another communication method, such as Bluetooth®.

Figure 3:
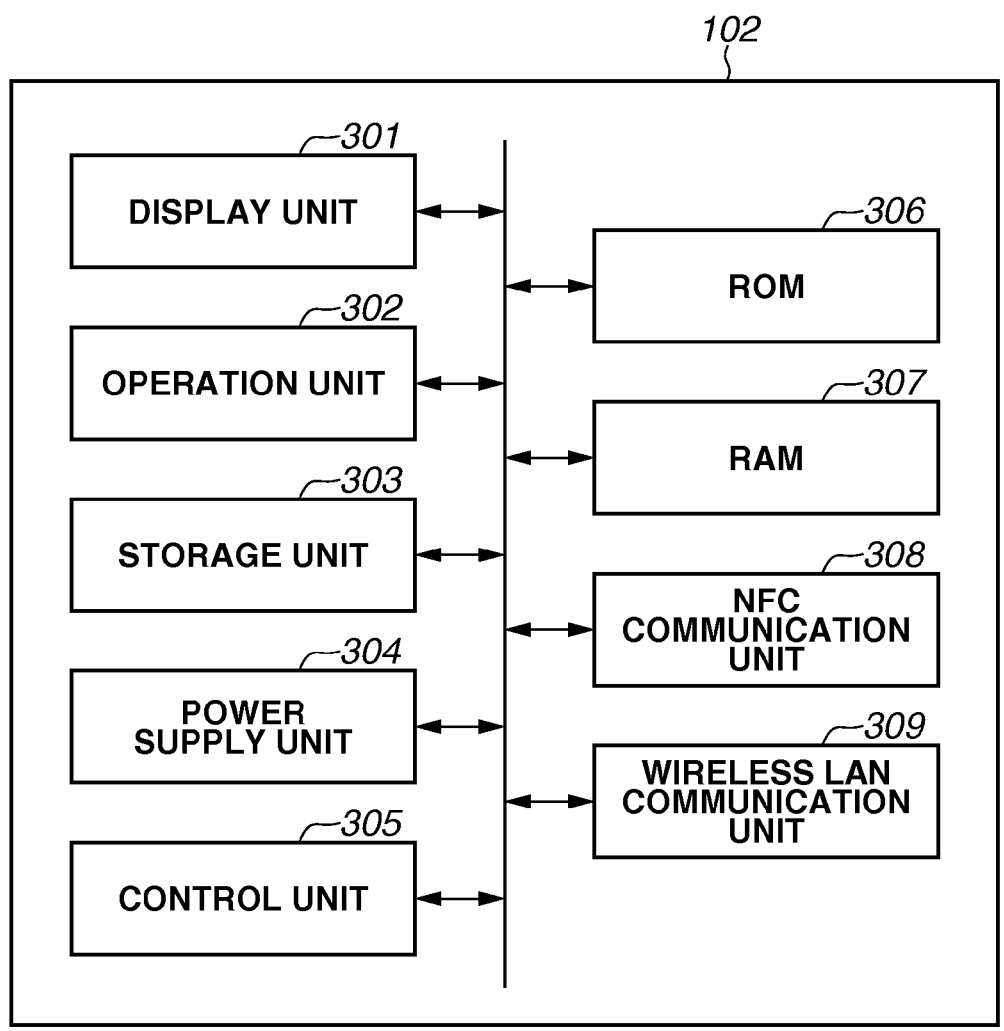
FIG. 3 is a block diagram illustrating an example of a hardware configuration of a tablet personal computer (PC) according to the exemplary embodiment.

Next, FIG. 3 is a block diagram illustrating a hardware configuration of the tablet PC 102. The tablet PC 102 includes a display unit 301, an operation unit 302, a storage unit 303, a power supply unit 304, a control unit 305, a ROM 306, a RAM 307, an NFC communication unit 308, and a wireless LAN communication unit 309. These units of the tablet PC 102 are identical to the corresponding units of the digital camera 101, and thus description thereof will be omitted here.

Next, a functional block configuration of each of the digital camera 101 and the tablet PC 102 will be described with reference to FIGS. 4 and 5. In the present exemplary embodiment, functional blocks of the digital camera 101 and those of the tablet PC 102 are stored as programs in the ROM 206 and the ROM 306, respectively. The functions are implemented by the control unit 205 and the control unit 305 executing these programs. Each function is realized by the control unit 205 and the control unit 305 performing control of each piece of hardware, as well as performing computation and processing of information according to the respective control program. A part or whole of each of these functional blocks may be provided as hardware. In this case, the part or whole of each of these functional blocks is configured of, for example, an application specific integrated circuit (ASIC).

Figure 4:
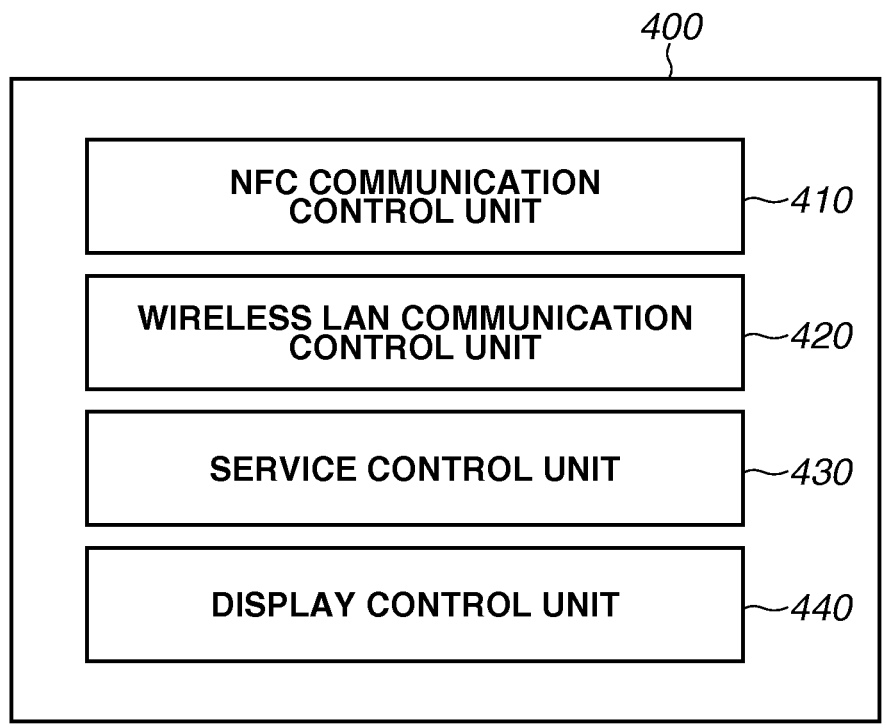
FIG. 4 illustrates an example of a functional block configuration of the digital camera according to the exemplary embodiment.

FIG. 4 illustrates a functional block configuration 400 of the digital camera 101. The digital camera 101 includes an NFC communication control unit 410, a wireless LAN communication control unit 420, a service control unit 430, and a display control unit 440.

The NFC communication control unit 410 is a processing unit that controls the NFC communication 103 performed via the NFC communication unit 208. The wireless LAN communication control unit 420 is a processing unit that controls the wireless LAN communication 104 performed via the wireless LAN communication unit 209. Further, the wireless LAN communication control unit 420 has a station (STA) function of operating as a station in an infrastructure mode of a wireless LAN, and an access point (AP) function of operating as an access point. The service control unit 430 is a processing unit that manages service information executable with use of the wireless LAN communication unit 209, and executes a service. The service control unit 430 controls execution of a service provided by the apparatus to which the service control unit 430 belongs, and/or use of a service provided by another apparatus. The display control unit 440 is a processing unit that controls output to the display unit 201 and input from the operation unit 202.

Figure 5:
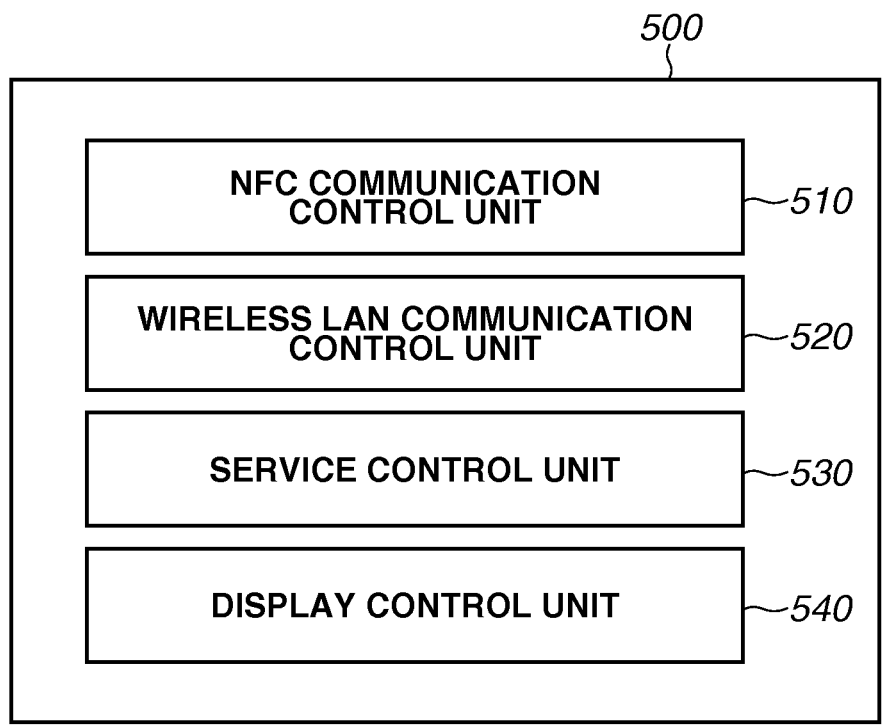
FIG. 5 illustrates an example of a functional block configuration of the tablet PC according to the exemplary embodiment.

FIG. 5 illustrates a functional block configuration 500 of the tablet PC 102. The tablet PC 102 includes an NFC communication control unit 510, a wireless LAN communication control unit 520, a service control unit 530, and a display control unit 540. These units of the tablet PC 102 are identical to the corresponding units of the digital camera 101, and thus description thereof will be omitted here.

The apparatus of the communication system according to the present exemplary embodiment is described as a digital camera and as a tablet PC, but may be, for example, any other types of apparatuses such as a printer, a PC, a video camera, a smartwatch, a smartphone, and a personal digital assistant (PDA) device.

An operation of the communication system having the above-described configuration will be described.

In a case described below with reference to a flowchart of FIG. 6, a handover from the NFC communication 103 to the wireless LAN communication 104 is performed between the digital camera 101 and the tablet PC 102 according to the present exemplary embodiment, and communication processing is performed via the wireless LAN communication 104.

Figure 6:
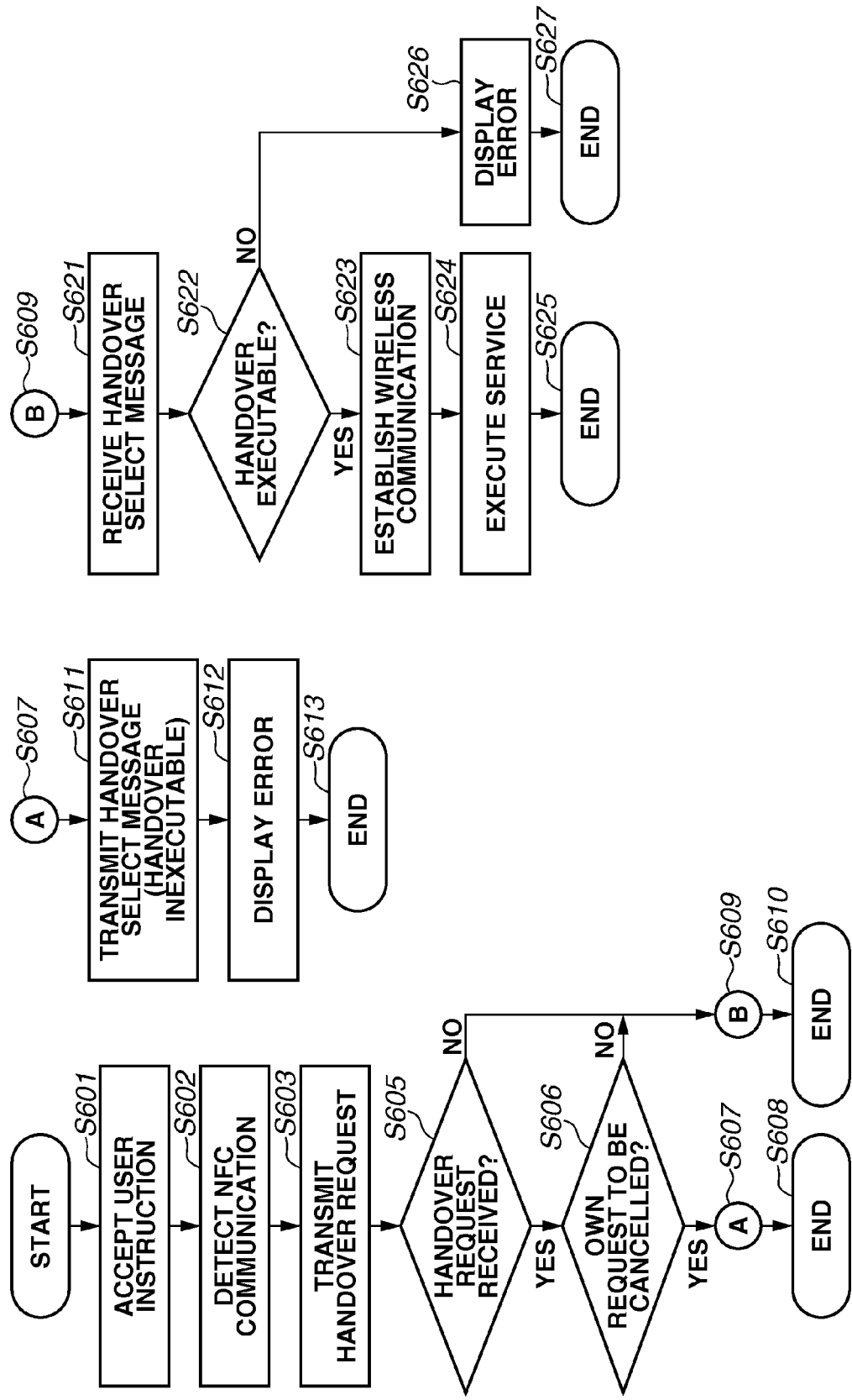
FIG. 6 is a flowchart illustrating operations of the digital camera and the tablet PC according to the exemplary embodiment.

The flowchart of FIG. 6 represents operation procedures of the digital camera 101 and the tablet PC 102. In the present exemplary embodiment, an operation flow of the digital camera 101 will be mainly described, and the tablet PC 102 is assumed to operate in an operation flow identical to the operation flow to be described below.

Figure 7:
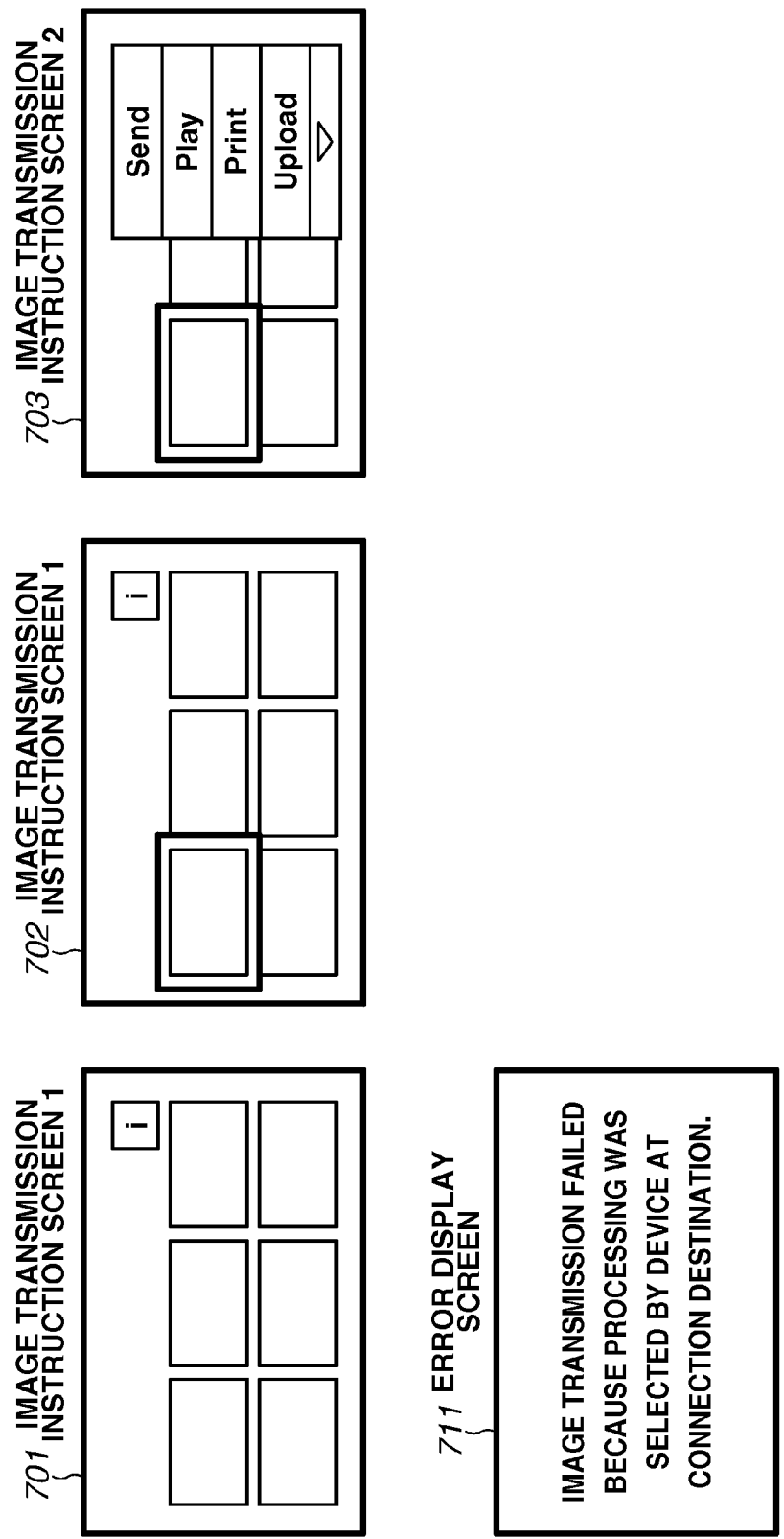
FIG. 7 illustrates display examples of the digital camera and the tablet PC according to the exemplary embodiment.

First, in step S601, the digital camera 101 accepts an instruction for executing a specific service, from a user via the operation unit 202. Specifically, the instruction is accepted via user operation as follows. First, a screen (a screen 701 in FIG. 7), which displays a list of reproduced images among images held in the digital camera 101, appears. Next, the operation unit 202 is caused to accept an instruction for selecting an image from the user (see a screen 702 in FIG. 7). The display unit 201 is then caused to display a screen (a screen 703 in FIG. 7) presenting a list of processes (services) for the image selected by the user. The digital camera 101 accepts operation of selecting a desired service from the user via the operation unit 202. In the present exemplary embodiment, the operation procedures in which the service is selected after the image is selected have been described, but the service may be selected by other procedures.

Next, in step S602, the digital camera 101 and the tablet PC 102 are brought in proximity to each other by operation of the user, and if entrance of the tablet PC 102 into a communication range of the NFC communication 103 is detected, the NFC communication unit 208 establishes a connection with the tablet PC 102. In step S603, when an NFC connection is established in a state where a service desired to be executed is selected, the digital camera 101 transmits, via the NFC communication 103, a handover request message including service information about the service desired to be executed. The handover request message is a message requesting that a connection be newly established in a communication method different from the NFC. The handover request message is assumed to be the one defined in Connection Handover Technical Specification of the NFC Forum that is an NFC standardization group.

In addition, "service" according to the present exemplary embodiment refers to a process to be executed by communication between an apparatus using a service and an apparatus providing the service. Examples of the service include services available in Wireless Fidelity (Wi-Fi) Direct Service. Examples of the services available in the Wi-Fi Direct Service include a SEND service for transmitting image data to an opponent terminal, a PLAY service for transmitting and reproducing moving image data, and a PRINT service for transmitting image data for printing.

The above-described service information is a message including service identification information and message type information. The service identification information is provided for uniquely identifying a service, and expressed in a character string such as "wfds.send". The service identification information may be expressed in a form other than a character string, such as a numerical value.

The message type information is provided to indicate which one of advertisement, request, and selection of a service is intended by the service information. In the present exemplary embodiment, "Advertised" is input as the message type information, in a case where one of the apparatuses advertises a service executable by this apparatus to the other apparatus. Further, "Requested" is input as the message type information, in a case where requesting a service is intended. Furthermore, "Selected" is input as the message type information, in a case where selection of a requested service is intended.

In addition, the handover request message includes a random value that is a random number to be used in avoiding processing for avoiding a conflict between the apparatuses in terms of their roles, in a case where the apparatuses connected via NFC each serve as a requester and transmit a request message. In the avoiding processing, the connected apparatuses each compare the random number included in the received request message with the random number included in the transmitted request message, and, of the apparatuses, one with the smaller value is determined to operate as a selector.

In step S603, to request the service designated by the user, the digital camera 101 transmits the service information in which the message type information is set as "Requested", to the tablet PC 102, by using the NFC communication unit 208.

In step S605, the digital camera 101 determines whether a handover request message is received from the tablet PC 102. If a handover request message is received from the tablet PC 102 (YES in step S605), the avoiding processing is executed. In this case, the digital camera 101 and the tablet PC 102 each recognize both operating as requesters, by receiving the request messages from each other, while having transmitted the respective request messages.

The digital camera 101 compares the random value included in the request message received from the tablet PC 102, with the random value included in the transmitted request message. If the random value included in the transmitted request message is smaller than the random value included in the received request message, the digital camera 101 determines to operate as a selector. In other words, when the digital camera 101 is to operate as a selector, the handover request message transmitted by the digital camera 101 is cancelled. On the other hand, to operate as a requester, the digital camera 101 cancels the handover request message received from the partner apparatus.

In step S606, the digital camera 101 determines whether the handover request message transmitted by the digital camera 101 is to be canceled. If the handover request message transmitted by the digital camera 101 is to be canceled (YES in step S606), then in step S607, a process A is executed. Subsequently, in step S608, the processing ends. If the handover request message is not received (NO in step S605), or if the handover request message of the digital camera 101 is not to be canceled (NO in step S606), then in step S609, a process B to be described below is executed. In step S610, the processing ends after the digital camera 101 completes the process B.

The process A will be described. In the process A in step S607, first, in step S611, the digital camera 101 transmits a handover select message, which indicates that a handover is unexecutable, to the tablet PC 102 by using the NFC communication unit 208. In other words, the digital camera 101 transmits a handover select message, which is intended to reject a handover and a service requested by the tablet PC 102 regardless of whether the handover and the service are executable. The digital camera 101 may be configured to determine whether a handover and a service requested by the tablet PC 102 are executable, and to reject the handover and the service even when having determined that the handover and the service are executable. Further, the apparatus determined to be the selector by the avoiding processing may be configured to reject the requested handover and service, without determining whether the requested handover and service are executable.

The handover select message is a response message issued in response to the received request message. The apparatus transmits a handover select message including information about a wireless communication method to which a handover is to be made and information about a service to be executed, if a communication method and a service requested by the partner apparatus are executable. On the other hand, the apparatus transmits an empty handover select message to the partner apparatus, if a handover is unexecutable. The handover select message may include information about an error reason, which indicates that a handover is not to be executed as a result of cancelling a handover request message including information about a service requested by the apparatus serving as a selector.

The handover select message is a Handover Select message defined in the Connection Handover Technical Specification of the NFC Forum.

Next, in step S612, the digital camera 101 displays, on the display unit 201, an error screen (a screen 711 in FIG. 7) notifying that the service is unexecutable. Then the processing ends in step S613. The error screen notifying that the service is unexecutable may display a way of cancelling this error, by prompting the user to establish the NFC connection again, after cancelling the selection of the service in the other apparatus.

In this way, if the request message requesting the service selected by the user is canceled, and whether the service is executable is unclear, the handover is not executed regardless of whether the service requested by the other apparatus is executable, and the error is notified. Therefore, the user can be immediately notified of the fact that the service selected by the user is unexecutable and the reason therefor. In addition, upon recognizing the reason why the service selected by the user is unexecutable, the user can readily determine operation for cancelling the error and implementing execution of the desired service.

For example, when having recognized that execution of the selected service is determined as an error by the avoiding processing, the user causes the digital camera 101 to establish the NFC communication 103 with the tablet PC 102 again, in a state where the service is not selected in the digital camera 101. Subsequently, the user causes the digital camera 101 to execute the service requested by the tablet PC 102. Next, the user selects the service in the digital camera 101 again, and in this state, the user causes the digital camera 101 to establish the NFC communication 103 with the tablet PC 102 again, so that the service requested by the digital camera 101 is executed. In this way, even if a request message transmitted from the other apparatus is cancelled by the avoiding processing, such an error can be handled in a manner that improves convenience of the user.

In the process B in step S609, first, in step S621, a handover select message is received from the tablet PC 102 by using the NFC communication unit 208. Next, in step S622, whether the handover is executable is determined based on contents of the received handover select message. In this case, if the digital camera 101 receives a handover select message indicating that the tablet PC 102 can execute the service requested by the transmitted handover request message, it is determined that the handover is executable (YES in step S622). If the digital camera 101 receives a handover select message indicating that the tablet PC 102 cannot execute the service requested by the transmitted handover request message, it is determined that the handover is unexecutable (NO in step S622).

If the handover is executable (YES in step S622), then in step S623, the wireless LAN communication 104 with the tablet PC 102 is established by using the wireless LAN communication unit 209. To establish the wireless LAN communication 104, communication parameters for the wireless LAN communication 104 are included in the handover request message or the handover select message exchanged between the apparatuses. The communication parameters include wireless communication parameters necessary to perform the wireless LAN communication 104, such as a service set identifier (SSID) serving as a network identifier, an encryption method, an encryption key, an authentication method, an authentication key, and a media control access (MAC) address. Further, information such as an Internet Protocol (IP) address to communicate with an IP layer may be included.

Next, in step S624, the digital camera 101 executes the desired service by using the wireless LAN communication 104 performed by the wireless LAN communication unit 209. In step S625, the processing ends. On the other hand, if the handover is unexecutable (NO in step S622), then in step S626, the digital camera 101 displays, on the display unit 201, an error screen (the screen 711 in FIG. 7) notifying that the service is unexecutable. In step S627, the processing ends. In step S626, an error screen may be displayed according to an error reason included in the handover select message received from the tablet PC 102. The error screen may display a way of cancelling this error, by prompting the user to establish the NFC connection again, after cancelling the selection of the service in the other apparatus.

Figure 8:
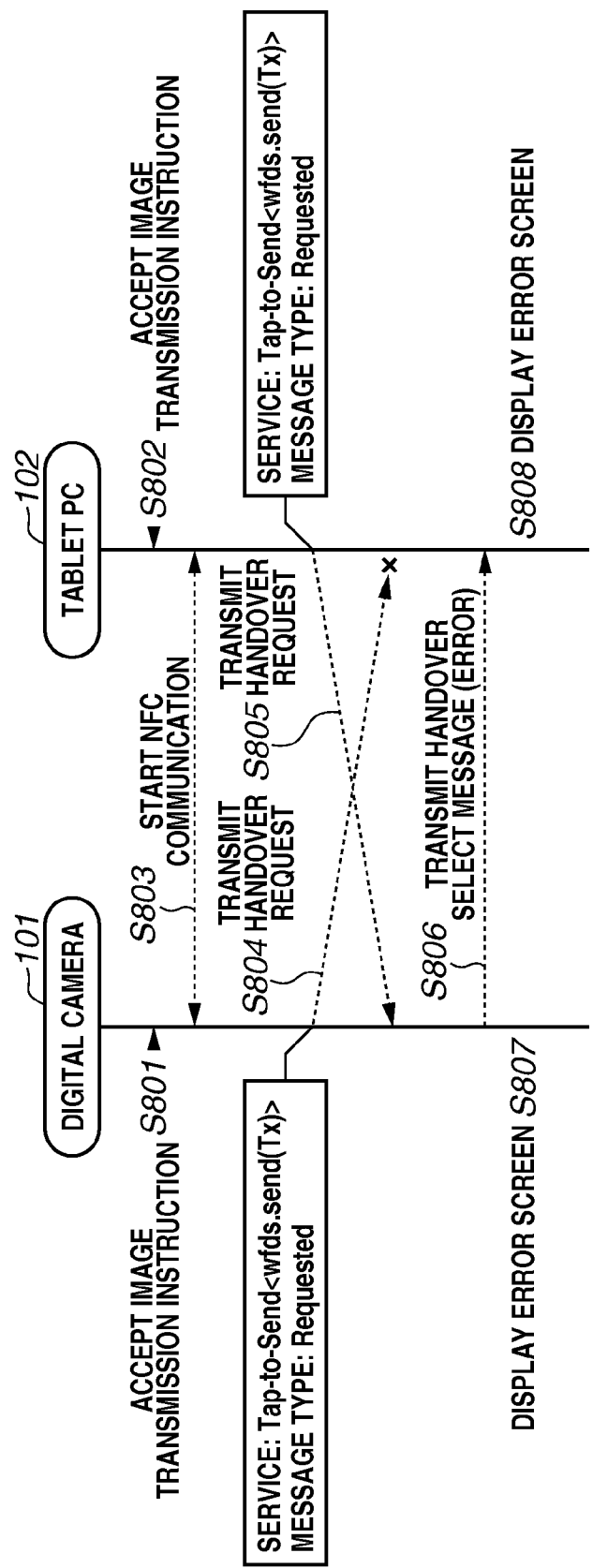
FIG. 8 illustrates an example of a communication sequence between the digital camera and the tablet PC according to the exemplary embodiment.

Next, an example of a communication sequence between the digital camera 101 and the tablet PC 102 will be described in detail with reference to FIG. 8. First, in FIG. 8, the digital camera 101 and the tablet PC 102 each accept an instruction of selecting an image to be processed from images held therein, and executing a Send service of the Wi-Fi Direct in step S801 and step S802. Next, in step S803, in response to user operation of bringing the digital camera 101 and the tablet PC 102 in proximity to each other, the NFC communication 103 is established therebetween. In step S804 and step S805, the digital camera 101 and the tablet PC 102 transmit the respective handover request messages to each other. In this process, the digital camera 101 and the tablet PC 102 are each in such a state where a service desired to be executed after a handover is selected. Therefore, the digital camera 101 and the tablet PC 102 transmit the respective handover request messages to each other by the NFC communication 103. In each of the handover request messages transmitted here, "wfds.send" indicating the Send service of the Wi-Fi Direct is input as the service identification information. Further, "Requested", which refers to requesting a partner apparatus to provide a service, is input as the message type.

The digital camera 101 and the tablet PC 102 each perform the avoiding processing. The digital camera 101 and the tablet PC 102 each determine whether to become a selector that transmits a response message, based on a random value of the transmitted handover request message with a random value of the received handover request message. Here, it is assumed that the digital camera 101 becomes the selector, and the handover request message transmitted by the digital camera 101 is canceled in the tablet PC 102.

When the handover request message transmitted by the digital camera 101 is canceled, then in step S806, the digital camera 101 transmits a handover select message including no service information, thereby notifying that the service requested by the tablet PC 102 is unexecutable. In step S807, the digital camera 101 displays an error on the display unit 201. The error indicates that the service selected by the user of the digital camera 101 is unexecutable. In step S808, the tablet PC 102 also displays a similar error.

As described above, according to the present exemplary embodiment, if a request message requesting a service selected by the user is canceled and whether the service is executable is unclear, the apparatus notifies an error, without executing a handover regardless of whether a service requested by the other apparatus is executable. Therefore, the user can be immediately notified of the fact that the service selected by the user is unexecutable and the reason therefor. In addition, according to the present exemplary embodiment, the apparatus determined as a selector by the avoiding processing can avoid performing a handover for executing a service requested by the communication partner apparatus, while whether a service requested by the apparatus serving as the selector is executable is unclear. Therefore, it is possible to suppress increase in processing load of the apparatus that has become the selector by the avoiding processing, and reduce a possibility of unexpected power consumption.

Another operation procedures of the digital camera 101 and the tablet PC 102 will be described with reference to a flowchart of FIG. 9. In the present exemplary embodiment, if a conflict occurs between the handover request messages, a handover is not executed regardless of whether a service requested by the partner apparatus is executable. Described below is a configuration in which at least a handover is executed even if a conflict occurs between the handover request messages.

Figure 9:
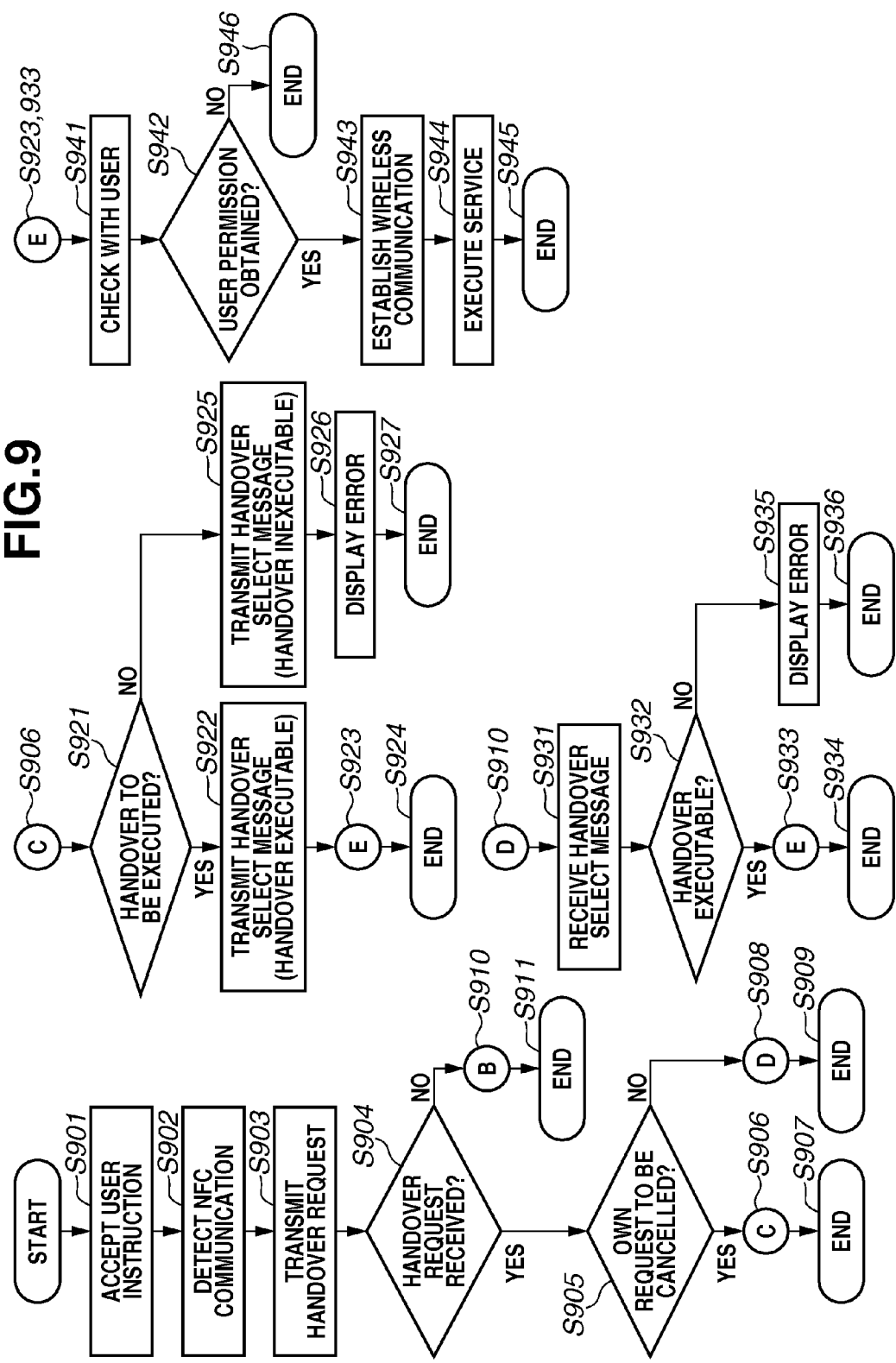
FIG. 9 is a flowchart illustrating operations of the digital camera and the tablet PC according to the exemplary embodiment.

The flowchart of FIG. 9 illustrates operation procedures of the digital camera 101 and the tablet PC 102. In the present exemplary embodiment, an operation flow of the digital camera 101 will be mainly described, and the tablet PC 102 is assumed to operate in the same operation flow. Points similar to the contents described above will not be described.

First, in step S901, the digital camera 101 accepts an instruction for executing a specific service, from a user via the operation unit 202. When establishment of the NFC communication is detected in step S902, then in step S903, the digital camera 101 transmits a handover request message. In this process, in addition to the service information described above, information, which indicates that a handover is to be executed even if a service is unexecutable, is added to the handover request message.

If a handover request message is received from the tablet PC 102 (YES in step S904), then in step S905, it is determined whether the handover request message of the digital camera 101 or the handover request message of the tablet PC 102 is to be canceled according to a difference between the respective random values. If the handover request message of the digital camera 101 is to be canceled (YES in step S905), a process C is performed in step S906, and then the processing ends in step S907. If the handover request message of the tablet PC 102 is to be canceled (NO in step S905), a process D is performed in step S908, and then the processing ends in step S909. On the other hand, if no handover request message is received from the tablet PC 102 (NO in step S904), a process B is performed in step S910, and then the processing ends in step S911.

The process B in step S908 is identical to the process B described above, and thus description thereof will be omitted.

In the process C in step S906, first, it is determined whether the above-described information, which indicates that a handover is to be executed even if a service is unexecutable, is included in the handover request message received from the tablet PC 102 in step S921. If the information indicating that the handover is to be executed is included (YES in step S921), then in step S922, the digital camera 101 transmits a handover select message including information about a wireless communication method to which the handover is to be made and information indicating that the handover is to be executed. Further, a process E is performed in step S923, and then the processing ends in step S924. On the other hand, if the information indicating that the handover is to be executed is not included (NO in step S921), then in step S925, the digital camera 101 transmits an empty select message indicating that the handover is not to be executed. Next, in step S926, an error is displayed, and then the processing ends in step S927. An error screen may display a way of cancelling this error, by prompting the user to establish the NFC connection again, after cancelling the selection of the service in the other apparatus.

In the process D in step S908, first, the digital camera 101 receives a handover select message from the tablet PC 102 in step S931, and then determines whether a handover is executable, based on contents of the received handover select message in step S932. If the handover is executable (YES in step S932), then in step S933, a process E is performed, and the processing ends in step S934. On the other hand, if the handover is unexecutable (NO in step S932), then in step S935, an error is displayed, and the processing ends in step S936. An error screen may display a way of cancelling this error, by prompting the user to establish the NFC connection again, after cancelling the selection of the service in the other apparatus.

Figure 10:
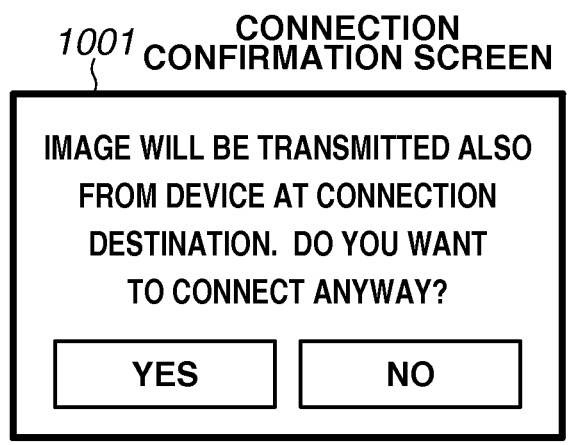
FIG. 10 illustrates a display example of the digital camera and the tablet PC according to the exemplary embodiment.

In the process E in each of step S923 and step S933, first, in step S941, a screen (a screen 1001 in FIG. 10) for asking the user whether to permit execution of the handover is displayed, because a service is also requested by the apparatus serving as a connection destination. Next, in step S942, the digital camera 101 accepts user operation performed on the screen asking the user whether to permit the execution of the handover, and determines whether permission for the execution of the handover is obtained from the user. If the permission is obtained for the execution of the handover (YES in step S942), then in step S943, the wireless LAN communication 104 is established. Next, in step S944, the service is executed, and then in step S945, the processing ends. On the other hand, if no permission is obtained for the execution of the handover (NO in step S942), then in step S946, the processing ends without establishing the wireless LAN communication 104. In this process, the tablet PC 102 may be notified, using the wireless LAN communication 104, that the wireless LAN communication 104 is not to be established.

Next, an example of a communication sequence between the digital camera 101 and the tablet PC 102 will be described in detail with reference to FIG. 11. In FIG. 11, first, the digital camera 101 and the tablet PC 102 each accept an instruction for executing a Send service of the Wi-Fi Direct, provided by user operation in step S1101 and step S1102. Next, in step S1103, in response to user operation of bringing the digital camera 101 and the tablet PC 102 in proximity to each other, the NFC communication 103 is established therebetween. In step S1104 and step S1105, the digital camera 101 and the tablet PC 102 transmit the respective handover request messages to each other.

In this process, in each of these handover request messages, "wfds.send" is input as the service identification information. In addition, "Requested" is input as the message type. Further, these handover request messages each include information indicating that a handover is to be executed even if a service is unexecutable.

Next, based on a random value in each of the handover request messages, the avoiding processing is executed. In this case, it is assumed that the digital camera 101 becomes a selector by the avoiding processing, and the handover request message transmitted by the digital camera 101 is canceled. When the handover request message transmitted by the digital camera 101 is canceled, then in step S1106, the digital camera 101 transmits a handover select message indicating that the handover is to be executed. Next, in step S1107, the digital camera 101 displays a screen (the screen 1001 in FIG. 10) asking the user whether to permit execution of the handover. In step S1108, the tablet PC 102 also displays a similar screen. If the execution of the handover is permitted at both the digital camera 101 and the tablet PC 102 in step S1109 and step S1110, then in step S1111, either one of these apparatuses transmits a request for establishing the wireless LAN communication 104. In step S1112, upon receipt of the request for establishing the wireless LAN communication 104, the other one of the apparatuses transmits a response to the request for the connection. In step S1113 and step S1114, the digital camera 101 and the tablet PC 102 execute the Send services for each other. Then in step S1115, the wireless LAN communication 104 is disconnected.

As described above, according to the present exemplary embodiment, both of the apparatuses can execute services requested by each other, even if both transmit the respective handover request messages to each other. In addition, it is possible to prevent execution of a service not intended by the user, by executing the services requested by the respective apparatuses after permission is obtained from the user.

Moreover, according to the present exemplary embodiment, the apparatus determined as a selector by the avoiding processing can avoid performing a handover for executing a service requested by the communication partner apparatus, while whether a service requested by the apparatus serving as the selector is executable is unclear. Therefore, it is possible to suppress increase in processing load of the apparatus determined as the selector by the avoiding processing, and reduce a possibility of unexpected power consumption.

Further, according to the present exemplary embodiment, it is possible to alleviate inconvenience in a case where the apparatuses connected to each other transmit the respective request messages to each other.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are seen to be limiting. The scope of the following claims is to be accorded the broadest interpretation so as to encompass all such modifications and equivalent structures and functions.

This application claims the benefit of Japanese Patent Application No. 2014-149932, filed Jul. 23, 2014, which is hereby incorporated by reference herein in its entirety.

What is claimed is:

1. A communication apparatus comprising:
a first communication unit configured to perform wireless communication with another communication apparatus, using a first communication method;
a second communication unit configured to perform wireless communication with the another communication apparatus using a second communication method in which a communication speed is higher than a communication speed in the first communication method;
a determination unit configured to determine, when the communication apparatus is connected to the another communication apparatus by the first communication unit, if the communication apparatus transmits a request message requesting a connection with the another communication apparatus by the second communication unit and receives a request message requesting a connection using the second communication method from the another communication apparatus, whether a response message is to be transmitted by the communication apparatus or by the another communication apparatus on the basis of a comparison between a random number included in the request message transmitted by the communication apparatus and a random number included in the request message received from the another communication apparatus; and
a transmission unit configured to transmit, if the determination unit determines that the communication apparatus transmits the response message, a response message rejecting the connection using the second communication method to the another communication apparatus using the first communication unit, regardless of whether the connection using the second communication method requested in the request message received from the another communication apparatus is executable, wherein ,if the determination unit determines that the another communication apparatus transmits the response message, the second communication unit performs wireless communication with the another communication apparatus according to the response message transmitted by the another communication apparatus.

2. The communication apparatus according to claim 1, wherein the transmission unit includes, in the response message, information indicating that transmission of the request message by each of the communication apparatus and the another communication apparatus is a reason for an error.

3. The communication apparatus according to claim 1, further comprising a display control unit configured to display, if the transmission unit transmits the response message rejecting the connection using the second communication method, information indicating that transmission of the request message by each of the communication apparatus and the another communication apparatus is a reason for an error.

4. The communication apparatus according to claim 1, wherein the first communication unit performs communication based on Near Field Communication.

5. The communication apparatus according to claim 1, wherein the second communication unit performs wireless communication conforming to IEEE 802.11 series.

6. The communication apparatus according to claim 1, wherein the request message is a Handover Request message defined by NFC Forum.

7. The communication apparatus according to claim 1, wherein the response message is a Handover Select message defined by NFC Forum.

8. The communication apparatus according to claim 1, wherein the request message transmitted by the communication apparatus and the request message received from the another communication apparatus each include information about a service requested to be executed using communication according to the second communication method.

9. The communication apparatus according to claim 1, wherein the determination unit determines whether a response message is to be transmitted by the communication apparatus or by the another communication apparatus if both of the communication apparatus and the another communication apparatus simultaneously send a request message after communication link of the first communication method has been established.

10. A control method executed by a communication apparatus including a first communication unit configured to perform wireless communication with another communication apparatus using a first communication method and a second communication unit configured to perform wireless communication with the another communication apparatus using a second communication method in which a communication speed is higher than a communication speed in the first communication method, the control method comprising:

determining, when the communication apparatus is connected to the another communication apparatus by the first communication unit, if the communication apparatus transmits a request message requesting a connection with the another communication apparatus by the second communication unit, and receives a request message requesting a connection using the second communication method from the another communication apparatus, whether a response message is to be transmitted by the communication apparatus or by the another communication apparatus on the basis of a comparison between a random number included in the request message transmitted by the communication apparatus and a random number included in the request message received from the another communication apparatus; and transmitting, if it is determined that the communication apparatus transmits the response message, a response message rejecting the connection using the second communication method to the another communication apparatus using the first communication unit, regardless of whether the connection using the second communication method requested in the request message received from the another communication apparatus is executable, wherein ,if it is determined that the another communication apparatus transmits the response message, performing wireless communication via the second communication unit with the another communication apparatus according to the response message transmitted by the another communication apparatus.

11. A non-transitory computer readable storage medium storing computer executable instructions causing a communication apparatus including a first communication unit configured to perform wireless communication with another communication apparatus using a first communication method and a second communication unit configured to perform wireless communication with the another communication apparatus using a second communication method in which a communication speed is higher than a communication speed in the first communication method to execute a control method, the control method comprising:

determining, when the communication apparatus is connected to the another communication apparatus by the first communication unit, if the communication apparatus transmits a request message requesting a connection with the another communication apparatus by the second communication unit, and receives a request message requesting a connection using the second communication method from the another communication apparatus, whether a response message is to be transmitted by the communication apparatus or by the another communication apparatus on the basis of a comparison between a random number included in the request message transmitted by the communication apparatus and a random number included in the request message received from the another communication apparatus; and transmitting, if it is determined that the communication apparatus transmits the response message, a response message rejecting the connection using the second communication method to the another communication apparatus using the first communication unit, regardless of whether the connection using the second communication method requested in the request message received from the another communication apparatus is executable wherein ,if it is determined that the another communication apparatus transmits the response message, performing wireless communication via the second communication unit with the another communication apparatus according to the response message transmitted by the another communication apparatus.

\* \* \* \* \*